United States Patent
Becker et al.

(10) Patent No.: US 6,837,701 B2
(45) Date of Patent: Jan. 4, 2005

(54) DEVICE FOR REMOVING INJECTION MOULDED PARTS

(75) Inventors: Klaus Becker, Wetter (DE); Rüdiger Ostholt, Wetter (DE)

(73) Assignee: Mannesmann Plastic Machinery GmbH, München (DE)

( * ) Notice: Subject to any disclaimer, the term of this patent is extended or adjusted under 35 U.S.C. 154(b) by 254 days.

(21) Appl. No.: 10/275,030

(22) PCT Filed: Apr. 30, 2001

(86) PCT No.: PCT/DE01/01668
§ 371 (c)(1),
(2), (4) Date: Oct. 31, 2002

(87) PCT Pub. No.: WO01/83192
PCT Pub. Date: Nov. 8, 2001

(65) Prior Publication Data
US 2003/0096034 A1 May 22, 2003

(30) Foreign Application Priority Data
May 3, 2000 (DE) .......................................... 100 22 192

(51) Int. Cl.⁷ .............................................. B29C 45/40
(52) U.S. Cl. ...................................... 425/556; 264/334
(58) Field of Search ................................. 425/556, 438, 425/444; 264/334

(56) References Cited

U.S. PATENT DOCUMENTS

| | | | | |
|---|---|---|---|---|
| 4,865,536 A | * | 9/1989 | Inaba et al. | 425/556 |
| 5,718,930 A | * | 2/1998 | Stengel | 425/556 |
| 5,804,229 A | * | 9/1998 | Asai | 425/556 |
| 6,099,769 A | * | 8/2000 | Koch | 264/334 |

FOREIGN PATENT DOCUMENTS

| | | | |
|---|---|---|---|
| DE | 4228140 | * | 3/1994 |
| DE | 29722964 | * | 4/1998 |
| EP | 724944 | * | 8/1996 |
| EP | 2000218673 | * | 8/2000 |
| WO | 97/12741 | * | 4/1997 |

* cited by examiner

Primary Examiner—Tim Heitbrink
(74) Attorney, Agent, or Firm—Cohen, Pontani, Lieberman & Pavane

(57) ABSTRACT

A device for the removal of plastic injection moldings from the mold of an injection molding machine having movable and fixed die chucking plates includes a drive unit for moving an actuating element toward or away from the mold. The actuating element is connected to a spindle mounted in an engagement component. One end of the spindle is connected to a toothed disk. A tubular component is mated with the toothed disk so that the toothed disk is fixed with respect to rotation relative to the tubular disk and is axially movable therein. The tubular component is rotatable by the drive unit for effecting the axial displacement of the actuating element.

14 Claims, 5 Drawing Sheets

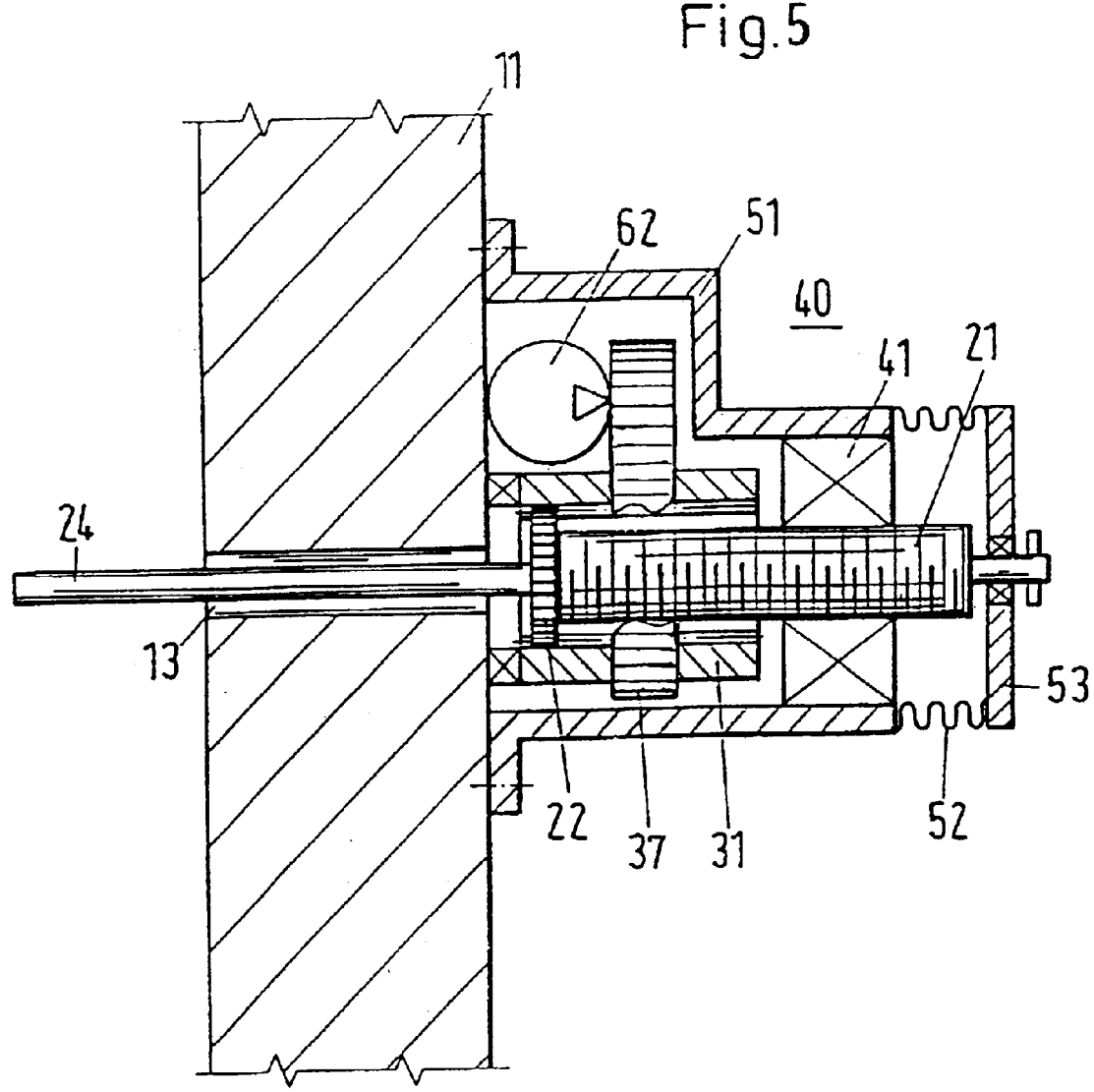

DEVICE FOR REMOVING INJECTION MOULDED PARTS

PRIORITY CLAIM

This is a U.S. national stage of application No. PCT/DE01/01668, filed on Apr. 30, 2001. Priority is claimed on that application and on the following application(s): Country: Germany, Application No.: 100 22 192.0, Filed: May 03, 2000.

BACKGROUND OF THE INVENTION

1. Field of the Invention

The invention relates to a device for the removal of injection moldings from the mold of an injection molding machine having a movable and a fixed die chucking plate with a drive unit for moving an actuating element linearly toward or away from the mold.

2. Description of the Prior Art

EP 0 724 944 discloses an ejector unit with a servomotor which is fastened to the movable die chucking plate and has a stator and a rotor, the rotor having fastened to it a hollow shaft possessing a ball-screw spindle nut, through which a ball-screw spindle shaft is capable of being moved forward and backward.

GB 297 22 964 discloses an ejector unit for an injection molding machine, in which the spindle is connected rigidly to the ejector plate and carries a nut which is rotatable via an electric motor.

In the above-mentioned ejector units, limits are placed in a disadvantageous way on the configuration of the ball-screw spindle nut, since the latter, together with the hollow shaft, is to be as small as possible in terms of its outside diameter.

DE 42 28 140 A1 discloses an ejector unit, in which an electric motor is seated as an ejector drive on a base capable of being attached to the mold carrier plate, said electric motor being in constant adjusting connection with a plurality of rotationally driveable threaded spindles, an ejector plate being capable of being adjusted on the threaded spindles via nut threads, the ejector plate carrying an ejector ram passing through the base and the mold carrier plate.

This design has the disadvantage that a large amount of space is required due to the arrangement of the electric motor and of the gear device.

EP 0 853 537 B1 discloses a device for the treatment and/or removal of injection moldings on an injection molding machine for the processing of plasticizable materials, the drive unit of which is a hollow-shaft motor receiving at least partially within it the actuating element, the device being supported on the mold closing device at a support element.

Provided centrally in relation to the injection axis of the injection molding machine is a space for arranging an ejector, a core extractor or an unscrewing mechanism, that is to say a device for the treatment and/or removal of injection moldings.

Due to the arrangement of the support element, the proposed ejector device requires a relatively large space, thus leading to obstructions on the closing side of the injection molding machine.

SUMMARY OF THE PRESENT INVENTION

The object of the present invention is to provide a device for the removal of injection moldings from an injection molding machine, in particular for plastics, which, along with a structurally simple, but at the same time robust design, and having a low construction volume, removes the injection moldings from the mold of an injection molding machine reliably.

The object of the present invention is achieved by a device for the removal of plastic injection moldings from the mold of an injection molding machine having movable and fixed die chucking plates, the device including a drive unit for moving an actuating element toward or away from the mold. The actuating element is connected to a spindle mounted in an engagement component. One end of the spindle is connected to a toothed disk. A tubular component is mated with the toothed disk so that the toothed disk is fixed with respect to rotation relative to the tubular disk and is axially movable therein. The tubular component is rotatable by the drive unit for effecting the axial displacement of the actuating element.

According to the present invention, the ejection rods for removing the injection moldings from the mold of an injection molding machine are connected to a spindle to which a toothed disk is fastened. This toothed disk is matched with a tubular component which envelops it. The tubular component is connected with the toothed disk so that the toothed disk and consequently the spindle are fixed with respect to rotation relative to tubular component so that they can be rotated by the tubular component, while at the same tune having unimpeded axial movability relative to the tubular component. The spindle is connected to an engagement component which is designed as a spindle nut or has individual movable sliding elements and for which any desired construction space is available. The nut may be designed generously in terms of its strength, since there is virtually no limit to its outside diameter. Furthermore, in the dimensionally appropriate form of construction proposed here, a particularly low level of noise is to be expected. The nut may be arranged in the housing together with the driveable tubular component. However, according to another embodiment, the nut may also be installed in the movable die chucking plate. In the latter, a particularly short form of construction of the ejector device is implemented, since only the electrical drive, whether it takes the form of an electric hollow-shaft motor or of an electric drive motor driven via gearwheels, is arranged on the outside of the movable die chucking plate.

In a further embodiment, the engagement component, the tubular component and the drive unit are combined as a compact structural unit which is fastened releasably to the movable die chucking plate.

When the gearwheel of a drive motor is arranged on the side facing the movable die chucking plate, the outwardly projecting spindle is surrounded by the drive motor and the housing enveloping the spindle nut. Alternatively, a bellows is provided, the mouth of which is covered by a cover which is mounted rotatably on the end face of the spindle. When a bellows is used, it is always only the smallest possible construction space which is occupied.

When a plurality of ejection rods are used, these are connected to one another via a crossmember, a thrust bearing being arranged between the end face of the spindle and the crossmember.

BRIEF DESCRIPTION OF THE DRAWINGS

An example of the invention is presented in the accompanying drawing, in which:

FIG. 5 is a cross-sectional view of a device for removal of injection moldings including the drive of a sleeve by a belt.

DETAILED DESCRIPTION OF THE PREFERRED EMBODIMENTS

Figure 1:
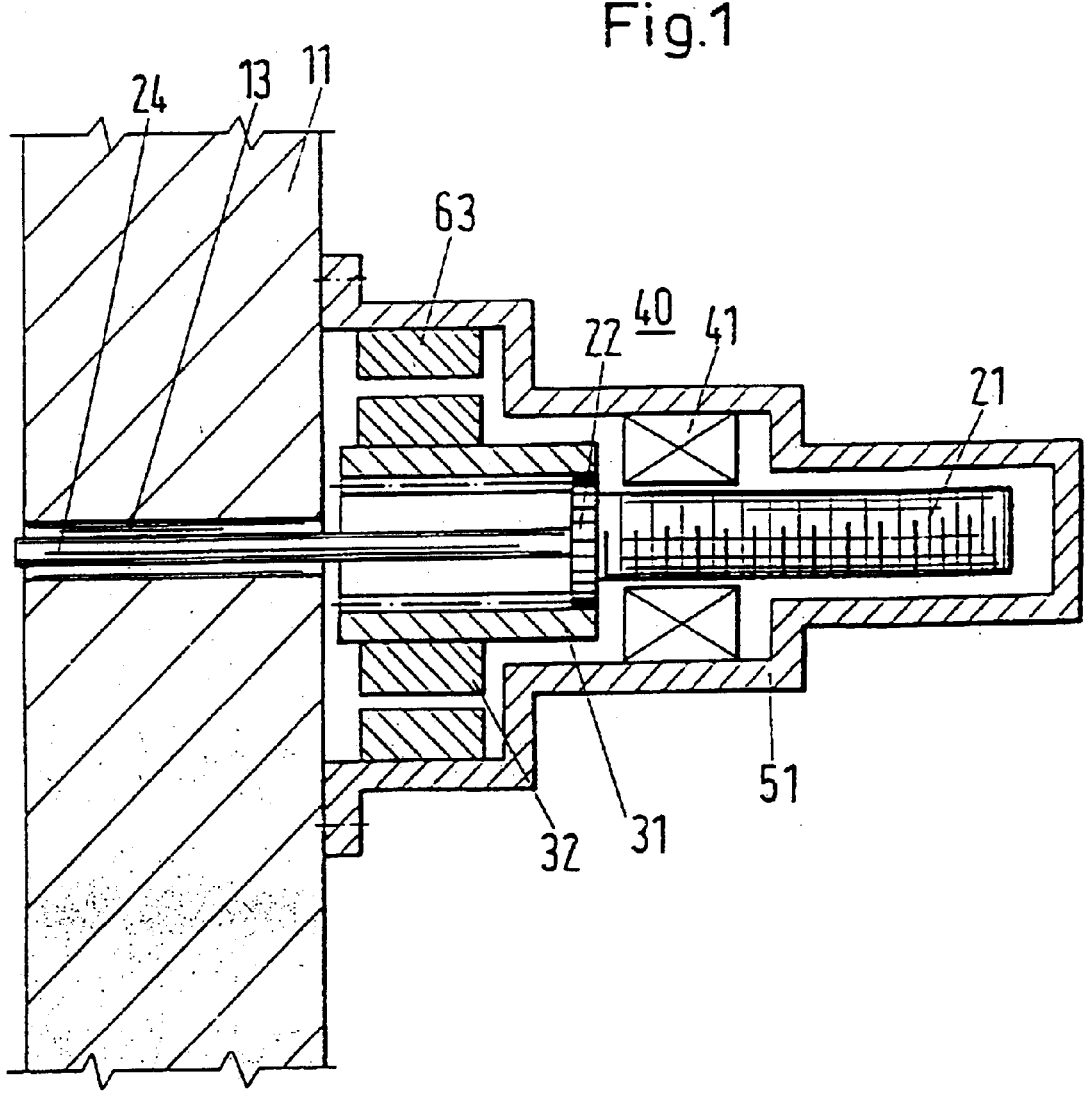
FIG. 1 is a cross-sectional view of a device for removal of injection moldings including a structural unit with a hollow-shaft motor in a rotor/nut arrangement.

The individual FIGS. 1–5 illustrate diagrammatically a movable die chucking plate 11 which has a bore 13 for receiving an ejection rod 24.

Furthermore, all the figures illustrate a spindle 21 in which a toothed disk 22 is fastened to one end face. The toothed disk 22 in this case has an outside diameter D which is larger than the outside diameter d of the spindle 22 (see FIG. 2).

Figure 2:
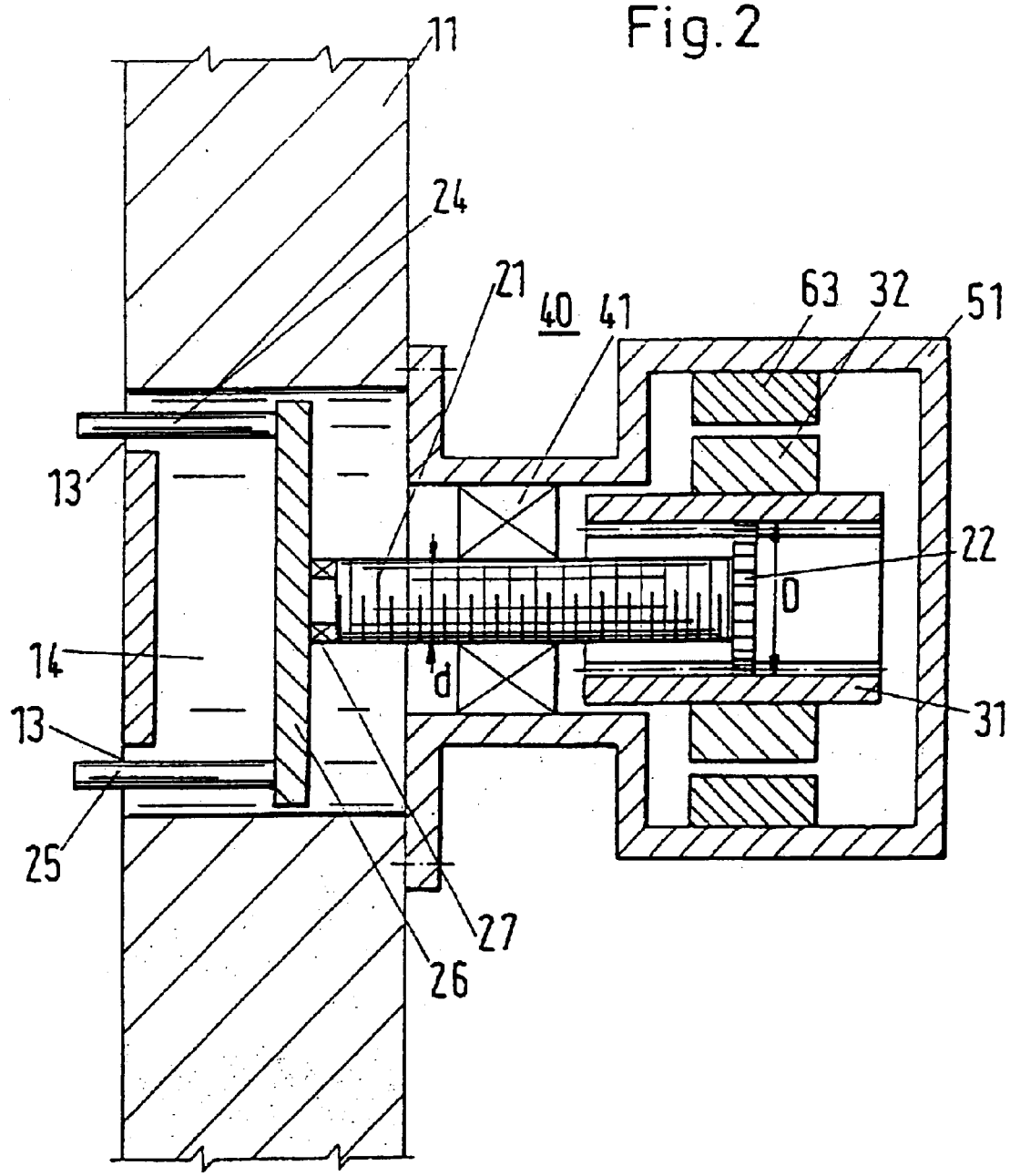
FIG. 2 is a cross-sectional view of a device for removal of injection moldings including a structural unit with a hollow-shaft motor in a nut/rotor arrangement.
Figure 3:
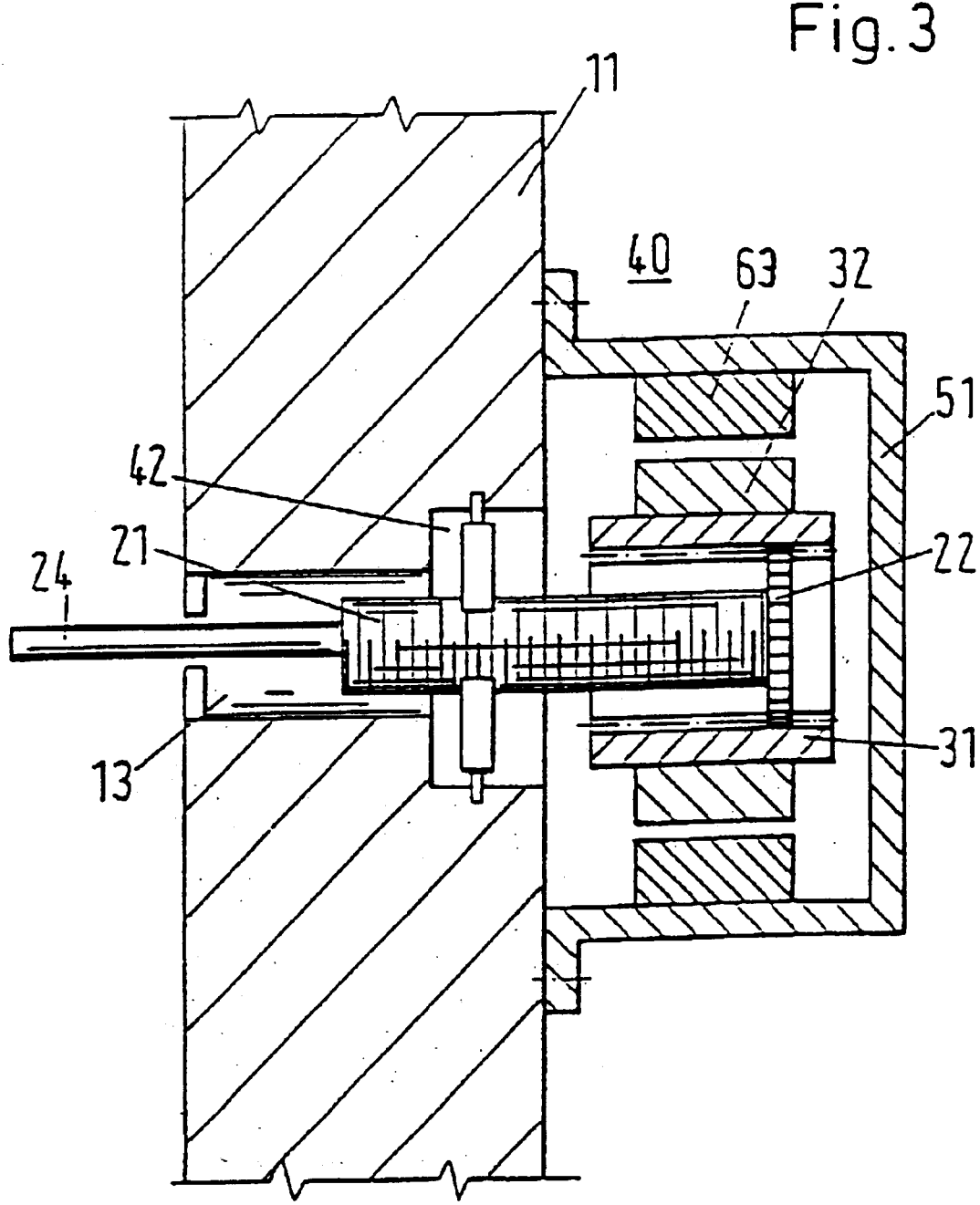
FIG. 3 is a cross-sectional view of a device for removal of injection moldings including a hollow-shaft motor with a spindle having different pitches.

The spindle is mated with a corresponding engagement component 40 which either is designed as a spindle nut 41 (FIGS. 1, 2, 4, and 5) or is constructed from sliding elements 42 (FIG. 3).

The teeth of the toothed disk 22 are mated with an internal toothing of the tubular component 31. The toothed disk 22 is axially movable and fixed with respect to rotation relative to the tubular component 31.

Figure 4:
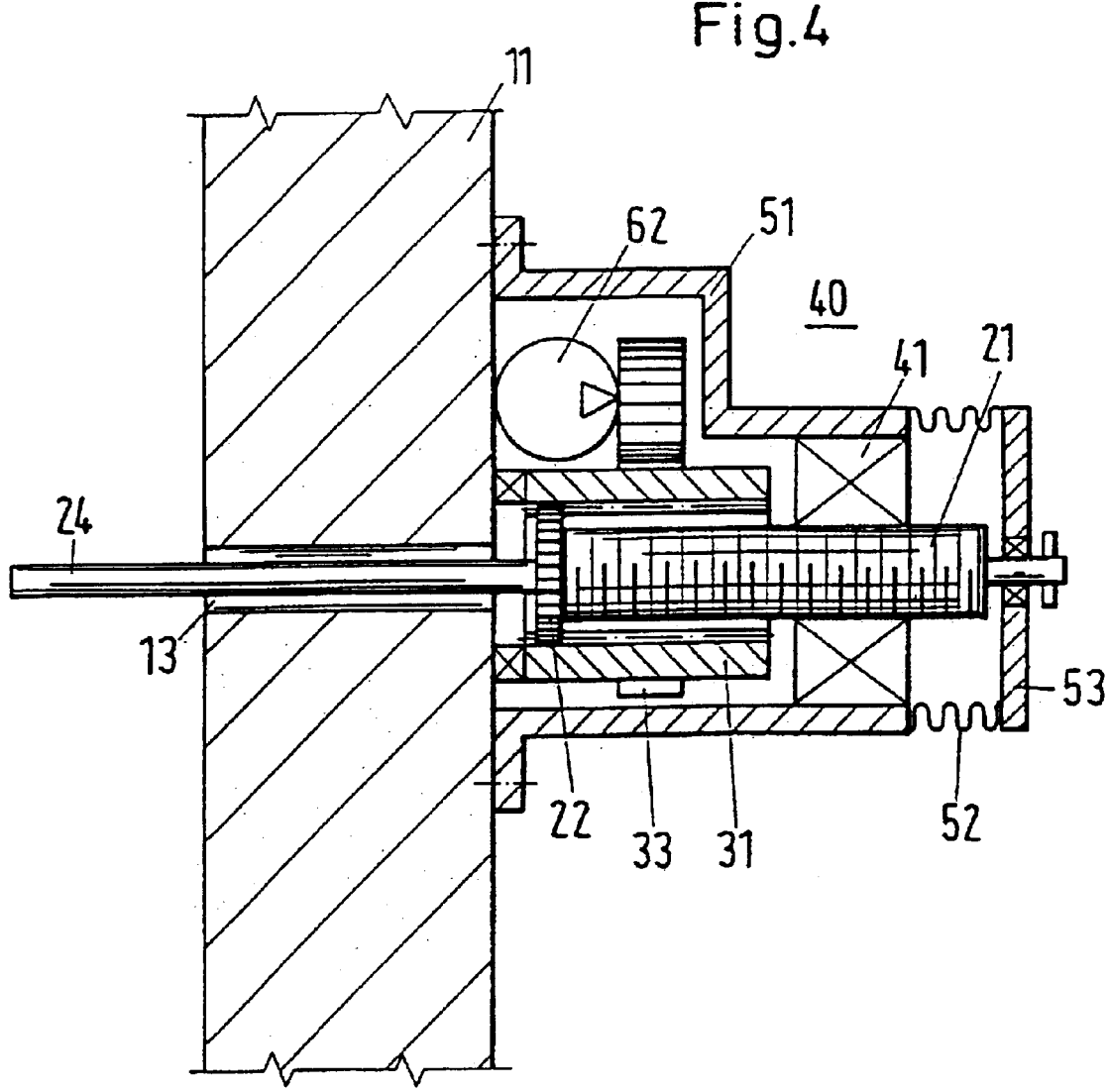
FIG. 4 is a cross-sectional view of a device for removal of injection moldings including a drive of the sleeve via compact motors and a bellows as spindle protection.

The tubular component 31 is in this case connected either to a rotor 32 of a hollow-shaft motor 63 (FIG. 1-3) or, via a toothing 33, to the output gearwheel of an electric drive motor 62 (FIG. 4).

The drive unit is in each case enveloped by a housing 51.

In FIG. 1, a hollow-shaft motor is provided which is arranged in that region of the ejector device which is inclined toward the movable die chucking plate. The spindle nut 41 is provided in the same housing 51 which envelops the hollow-shaft motor 63.

The free projecting end of the spindle 21 is likewise enveloped by the housing 51.

In this form of construction, the largest diameter of the ejection unit is arranged in the vicinity of the outside of the die chucking plate 11, so that the components having only a smaller diameter project into the free space in a space-saving manner.

In FIG. 2, the hollow-shaft motor 63 and the spindle nut 21 are enveloped as a structural unit by a housing 51, the spindle nut 21 being inclined toward the movable die chucking plate 11.

In the present configuration, part of the spindle 21 projects into an orifice 14 provided in the movable die chucking plate 11. This orifice 14 is connected to two bores 13 through which the ejection rods 24, 25 may project. The ejection rods 24 and 25 are connected to one another via a crossmember 26. A thrust bearing 27 is arranged between the crossmember 26 and the spindle 21.

In FIG. 3, the engagement component 40 is arranged in the movable die chucking plate 11. In the present case, the engagement component 40 has a plurality of sliding elements 42 which are matched with the spindle 21. The sliding elements 42 are in this case mounted so as to be angularly movable, so that a spindle 21 possessing a variable pitch can be used.

In the present configuration of the ejection device, only the drive, designed here as a hollow-shaft motor 63, including the rotor 32 and the tubular component 31, surrounded by the housing 51, is arranged outside the movable die chucking plate 11. This results in an extremely compact and space-saving unit.

In FIGS. 4 and 5, the tubular component 31 is driven by an electric drive motor 62. The use of a toothing 33 is shown in FIG. 4 and a belt 37 is shown in FIG. 5.

In the present case, that part of the spindle 21 which projects from the spindle nut 41 is enveloped by a bellows 52. The bottom of the bellows 52 is covered by a bottom plate 53 which, rotatably mounted, is fastened to the spindle 21. In this way, the free space is occupied only whenever the spindle actually projects into this space.

What is claimed is:

1. A device for removing plastic injection moldings from a mold of an injection molding machine having fixed and movable die chucking plates, said device comprising:

a spindle having first and second ends and an outer diameter;

a toothed disk connected to said first end of said spindle and having a disk diameter that is larger than the outside diameter of said spindle so that said toothed disk projects radially beyond the outer diameter of said spindle;

an actuating component for removing the plastic injection moldings, said actuating component connected for axial movement with said spindle;

an engagement component adapted to be connected at a fixed position relative to the movable die chucking plate of the injection mold machine, said spindle being mounted in said engagement component such that said spindle is movable with said toothed disk and said actuating component in an axial direction relative to the engagement component toward or away from the mold;

a tubular component mated with said toothed disk such that said toothed disk is fixed with respect to rotation relative to said tubular component and is axially movable relative to said tubular component; and a drive unit connected to said tubular component for effecting a rotation of said tubular component, said toothed disk and said spindle being induced into rotation by the rotation of said tubular component, wherein the rotation of said spindle in said engagement component effects an axial movement by said spindle, said toothed disk, and said actuating element toward or away from said mold.

2. The device of claim 1, wherein said engagement component comprises a spindle nut.

3. The device of claim 1, wherein said engagement component comprises sliding elements movably arranged for receiving a spindle of varying pitch.

4. The device of claim 2, wherein said engagement component is adapted to be fastened directly to the movable die chucking plate.

5. The device of claim 3, wherein said engagement component is adapted to be fastened directly to the movable die chucking plate.

6. The device of claim 1, wherein said drive unit comprises a hollow-shaft motor having a rotor and said tubular component is connected to said rotor.

7. The device of claim 1, wherein said drive unit comprises an electric drive motor and said tubular component comprises a toothing on an outer side thereof for engagement with said electric drive motor.

8. The device of claim 1, wherein said drive unit comprises a belt for rotating said tubular unit.

9. The device of claim 7, wherein said tubular component is adapted to be mounted directly onto the movable die chucking plate.

10. The device of claim 8, wherein said tubular component is adapted to be mounted directly onto the movable die chucking plate.

11. The device of claim 1, wherein said tubular component is adapted to be mounted directly onto the movable die chucking plate.

12. The device of claim 1, further comprising a housing, wherein said engagement component, said tubular component, said drive unit are connected as a structural unit adapted to be releasably fastened to the movable die chucking plate.

13. The device of claim 1, wherein said actuating component includes a plurality of ejection rods connected by a crossmember and a thrust bearing arranged between said crossmember and said spindle.

14. The device of claim 1, further comprising a bellows enveloping said second end of said spindle.

* * * * *

UNITED STATES PATENT AND TRADEMARK OFFICE
CERTIFICATE OF CORRECTION

PATENT NO. : 6,837,701 B2
DATED : January 4, 2005
INVENTOR(S) : Klaus Becker

It is certified that error appears in the above-identified patent and that said Letters Patent is hereby corrected as shown below:

<u>Title page,</u>
Item [73], Assignee, should read -- Mannesmann Plastics Machinery GmbH --

Signed and Sealed this

Seventh Day of June, 2005

JON W. DUDAS
*Director of the United States Patent and Trademark Office*